(12) United States Patent
Rydahl et al.

(10) Patent No.: US 7,694,227 B2
(45) Date of Patent: *Apr. 6, 2010

(54) METHOD, SYSTEM, AND COMPUTER READABLE MEDIUM FOR MANAGING RESOURCE LINKS

(75) Inventors: Mads Rydahl, Copenhagen (DK); Max Kim Tobiasen, Copenhagen (DK)

(73) Assignee: Sublinks APS, Copenhagen (DK)

( * ) Notice: Subject to any disclaimer, the term of this patent is extended or adjusted under 35 U.S.C. 154(b) by 505 days.

This patent is subject to a terminal disclaimer.

(21) Appl. No.: 11/437,750

(22) Filed: May 22, 2006

(65) Prior Publication Data

US 2006/0212445 A1 Sep. 21, 2006

Related U.S. Application Data

(63) Continuation of application No. 10/129,332, filed as application No. PCT/DK00/00614 on Nov. 3, 2000, now Pat. No. 7,073,132.

(30) Foreign Application Priority Data

Nov. 3, 1999  (DK) ............................. 1999 01588

(51) Int. Cl.
*G06F 3/00* (2006.01)
(52) U.S. Cl. ................... 715/745; 715/707; 715/713
(58) Field of Classification Search ............. 715/853, 715/707, 713, 745
See application file for complete search history.

(56) References Cited

U.S. PATENT DOCUMENTS

| | | | |
|---|---|---|---|
| 5,115,501 A | 5/1992 | Kerr | |
| 5,239,617 A | 8/1993 | Gardner et al. | |
| 5,694,559 A | 12/1997 | Hobson et al. | |
| 5,917,491 A | 6/1999 | Bauersfeld | |
| 5,933,827 A | 8/1999 | Cole et al. | |
| 6,262,730 B1 | 7/2001 | Horvitz et al. | |
| 6,385,619 B1 | 5/2002 | Eichstaedt et al. | |
| 6,606,613 B1 | 8/2003 | Altschuler et al. | |

FOREIGN PATENT DOCUMENTS

| | | |
|---|---|---|
| GB | 2 333 617 | 7/1999 |
| GB | 2333617 A | 7/1999 |
| GB | 2 335 761 | 9/1999 |

OTHER PUBLICATIONS

Yoelle S. Maarek et al., "Automatically Organizing Bookmarks per Contents," *5th Int'l World Wide Web Conference*, Paris France (May 6-10, 1996).

(Continued)

*Primary Examiner*—Dennis Bonshock
(74) *Attorney, Agent, or Firm*—Harness, Dickey & Pierce, P.L.C.

(57) ABSTRACT

Resource links also known as Unified Resource Links (URL's), bookmarks, hyperlinks etc. located in a category hierarchy. The resource links are used to navigate on the world wide web, on a local machine, on the internet, or on an intranet. A method of assessing a users competence in a category in the category structure comprising the steps of analysing the users interaction with the resource links placed in the hierarchy table for that category and extracting a competence level for the user in that category.

14 Claims, 8 Drawing Sheets

OTHER PUBLICATIONS

Y. Maarek et al., "Automatically Organizing Bookmarks per Contents", Fifth International World Wide Web Conference, May 6-10, 1996, Paris, France.

European Office Action dated Aug. 3, 2005.

IEEE Article entitled An Architecture and Category Knowledge for Intelligent Information Retrieval Agent by Tu Hsieh-Chang et al.

Article entitled "A Bookmarking Service for Organizing and Sharing URLS" by Richard M. Keller et al.

METHOD, SYSTEM, AND COMPUTER READABLE MEDIUM FOR MANAGING RESOURCE LINKS

PRIORITY STATEMENT

This application is a continuation of application Ser. No. 10/129,332, filed May 3, 2002, now U.S. Pat. No. 7,073,132 now allowed, which is a 35 U.S.C. § 371 application of PCT/DK00/00614, filed Nov. 3, 2000, the entire contents of each of which is hereby incorporated by reference.

This invention relates to finding relevant resources on a large network. This has traditionally been done either by having a program search through the resources and placing indexed resource links in a database, or by having a human editor sort the resources and place resource links to the resources in a category hierarchy. Resource links are links pointing to a resource on the local computer or on a network. These resource links may include hyperlinks or bookmarks to documents on the Internet. A user may then conduct a search within the indexed resource links, and receive a search result based on matches to his search criteria.

The problem with these two approaches will be described below:

Having a program search through a large amount of content on the Internet or an Intranet and place indexed resource links in a searchable database poses some problems. It has proven to be extremely hard to create a program that can locate relevant content.

The main problem is that traditional programs will base the result of a search query on a computerized and stringent set of criteria, which often fall short of the complexity of the real world. It is very hard to set up algorithms for locating and rating the resource links that are relevant for a specific user's search. This is problematic since a very high number of search results are often returned. It is even harder to rate these returned results, based on quality or popularity because no measurement of these properties usually exists.

The problem is particularly evident when searching for content on the Internet, or on a large Intranet. An Intranet is a number of computers connected in a closed network.

Having a human editor sort through content and sorting resource links to the content into category hierarchy containing. several categories and subcategories poses other problems. It is very ineffective to use humans to index information, especially if the network is large, such as the Internet. This is problematic because it relies on the knowledge of the individual sorting the content. There is a fair chance that at least some resource links to content will be indexed or even rated incorrectly.

Furthermore, the problem with both of these approaches is that neither of the above systems relate the search results to the unique characteristics of the user conducting the search query. This is a problem since two users conducting a search containing the same search string may expect entirely different results, based on what prior knowledge and interests they have.

The known techniques to address these problems are inadequate, and fall far short of the goal. Particularly it has been hard to create a system that only indexes resource links to relevant pieces of content based on the users preferences. Typically a search query may result in thousands of returned results where only a marginal part are truly relevant for the user.

Thus, the problem with finding relevant content on a large network is that a large number of irrelevant results are returned to a search query, and that an editor does not possess the knowledge or the resources to sort a large number or resource links pointing to relevant content.

Implementing the device described below solves this problem.

Consequently, this invention relates to indexing content on a large network, rating it by relevance, filtering it, and presenting it to a user.

The invention will be explained more fully below in connection with a preferred embodiment and with reference to the drawing, in which.

Figure 1:
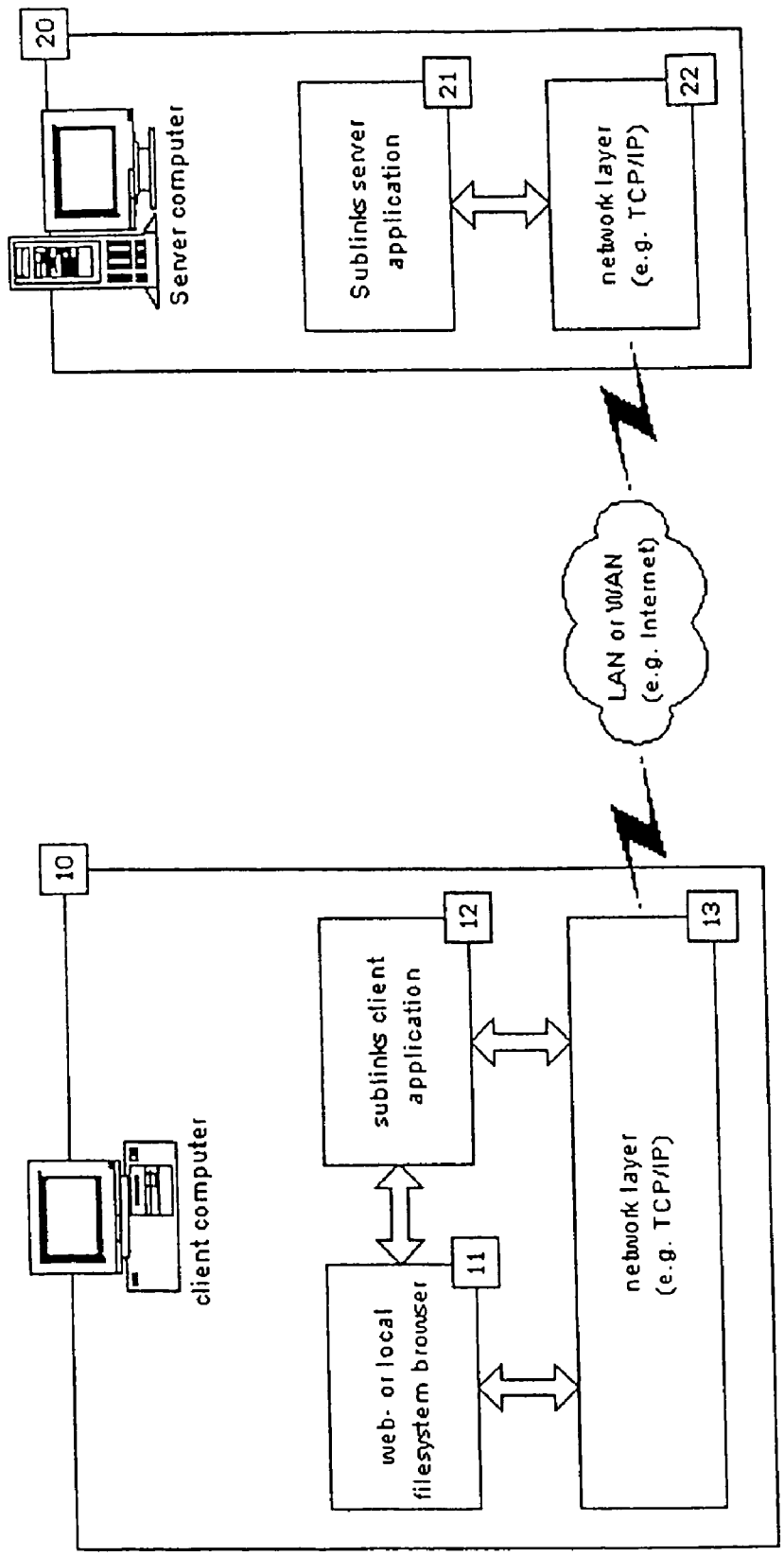
FIG. 1 shows a computer system with a client computer and a server computer for running a program according to the invention.

FIG. 1 shows a computer system with a client computer and a server computer for running a program according to the invention. A client communicates with a server via LAN or WAN. The client consists of a browser (11) and a client (12). The client communicates via a network layer (13) with the server (20) via WAN or LAN. The server consists of a server application (21) that communicates with the client protocol via a network layer (22).

The client application 12 monitors the client file- or web browser 11 activity and registers parameters representative of this activity. These parameters are submitted to the server application 21 via the network layer 13 either automatically or upon a user's command. The parameters can be e.g. the point of time at which a resource link is activated, the type of interaction, the time a connection to the resource was open, a reference to the resource link or the link itself, etc. The type of interaction can be e.g. clicking a link to the resource in a document, typing the URL to the resource in a browser, creating a bookmark to the resource etc.

The activity of the file- or web browser 11 can be monitored by direct interaction with the browsers event and properties system or by monitoring log data stored by the browser, or by monitoring network data traffic.

All client applications have a unique identification number. These parameters are submitted to the server application 21 as a packet with the unique identification number appended for the purpose of relating the parameters to a specific client at the server.

Figure 2:
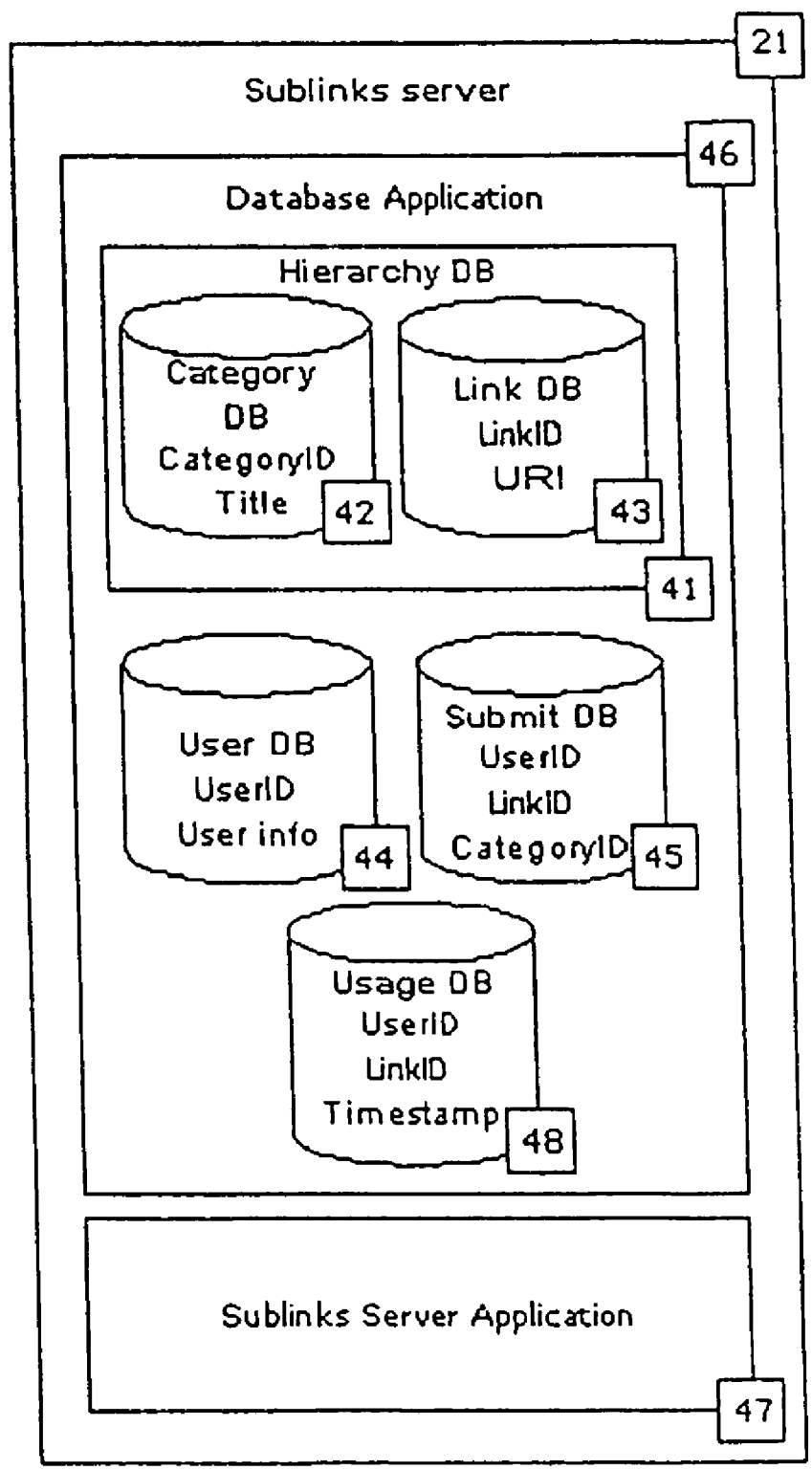
FIG. 2 shows components on the server computer.

FIG. 2 shows components on the server computer. The server application 47 requests and updates data via a database application 46. In the database application data is kept in a number of tables: A category table 42; a resource link table 43; a user table 44; a submit table 45; and a usage table 48.

Information in the form of parameters in packets received from client applications is processed by the server application and stored in different tables. Parameters relating to client interaction with resource links are stored in the usage table 48. If the type of client interaction is creating a bookmark to the resource, the parameters may be stored in the submit table 45.

A category hierarchy 41 wherein resource links are ordered exists on the server. This hierarchy comprises a category table 42 and a link table 43. If a resource link submitted by a client exists in the link table 43, the resource link is already associated with a category ID in the category table 42.

The category table 42 consists of at least, but not necessarily just the following fields:
ID. ID comprises a unique ID associated with the category.
Name. Comprises the name of the category The link table 43 consists of at least, but not necessarily just the following fields:
ID. ID comprises a unique ID associated with the link.
URL (Uniform Resource Locator)
Title. The title of the link. This title may be derived from the site that is linked to, or from user-input.

Together 42 and 43 comprise the hierarchy database 41.

The user table 44 consists of at least, but not necessarily just the following fields:
ID. A unique user ID to identify the user.
Userinfo, that may, among other things, consist of a name, codeword and demographical data.

The submit table 45 consists of at least, but not necessarily just the following fields:
Link ID, that refers to 43.
User ID, that refers to 44
Category ID, that refers to 42
Timestamp that asses when an item in the submit table has been accessed and for how long.

The usage table 48 consists of at least, but not necessarily just the following fields
Link ID, that refers to 43
User ID, that refers to 44
Timestamp that asses when an item in the submit table has been accessed and for how long.

Figure 3:
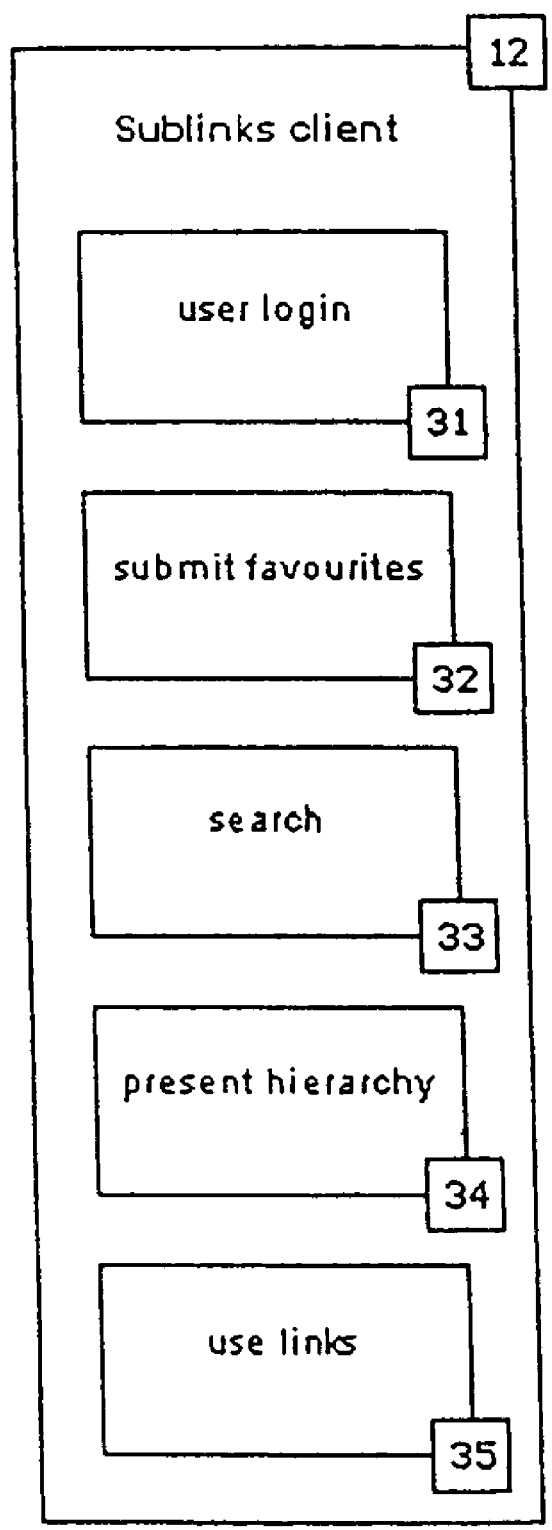
FIG. 3 shows components on the client computer.

FIG. 3 shows components on the client computer. Describes the client. The figure describes the client application in FIG. A. The client comprises the following parts:
User Login 31
Submit favourites 32
Search 33
Present hierarchy 34
Use links 35

Figure 4:
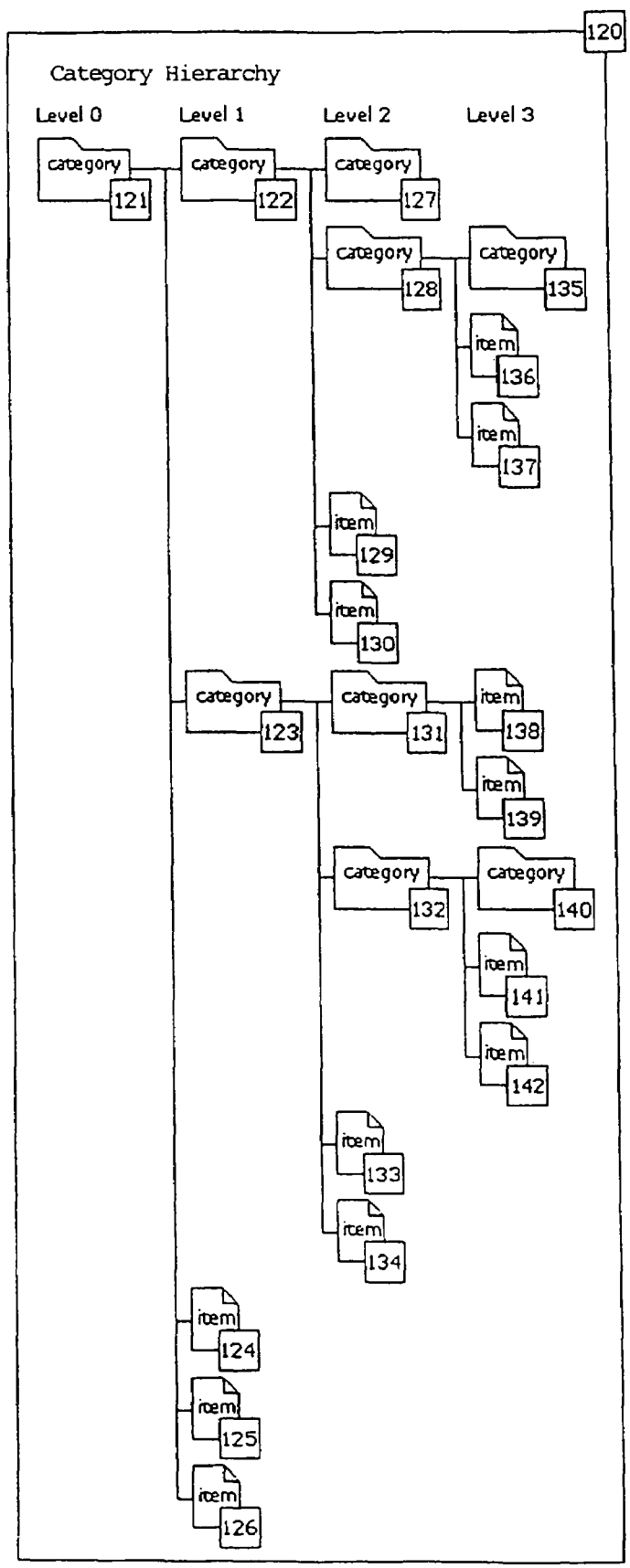
FIG. 4 shows a category hierarchy.

FIG. 4 shows a category hierarchy. The category hierarchy is stored in the hierarchy table 41. The hierarchy consists of a number of levels. On each level there are one or more categories. Each category may contain one or more categories and/or items in the form of resource links. In any category, on any given level in the category hierarchy it is possible to view items deriving from that category or any category within it. For instance viewing items in the category 121 on level 0, may include items 124, 125 and 126, but also items 129, 130, 136, 137, 138, 139, 133, 134, 141, and 142. Furthermore, viewing items in the category 123 on level 1, may include items 133 and 134, but also items 138, 139, 141 and 142, but not items 129, 130, 136 or 137.

The category hierarchy 120 can be viewed and browsed by a user of a client application 12, and viewed items may be presented in a filtered and/or rated list in accordance with claim 1. Filter and rating criteria may be set by the individual users. The individual users may also choose to move certain categories or items to other locations in the hierarchy. However, this may only affect the local presentation of the hierarchy for that user. If a user for instance chooses to do so he may have a level 3 category 135 presented in level 0 by moving it to this level. The category will remain in the same place in the server hierarchy.

Figure 5:
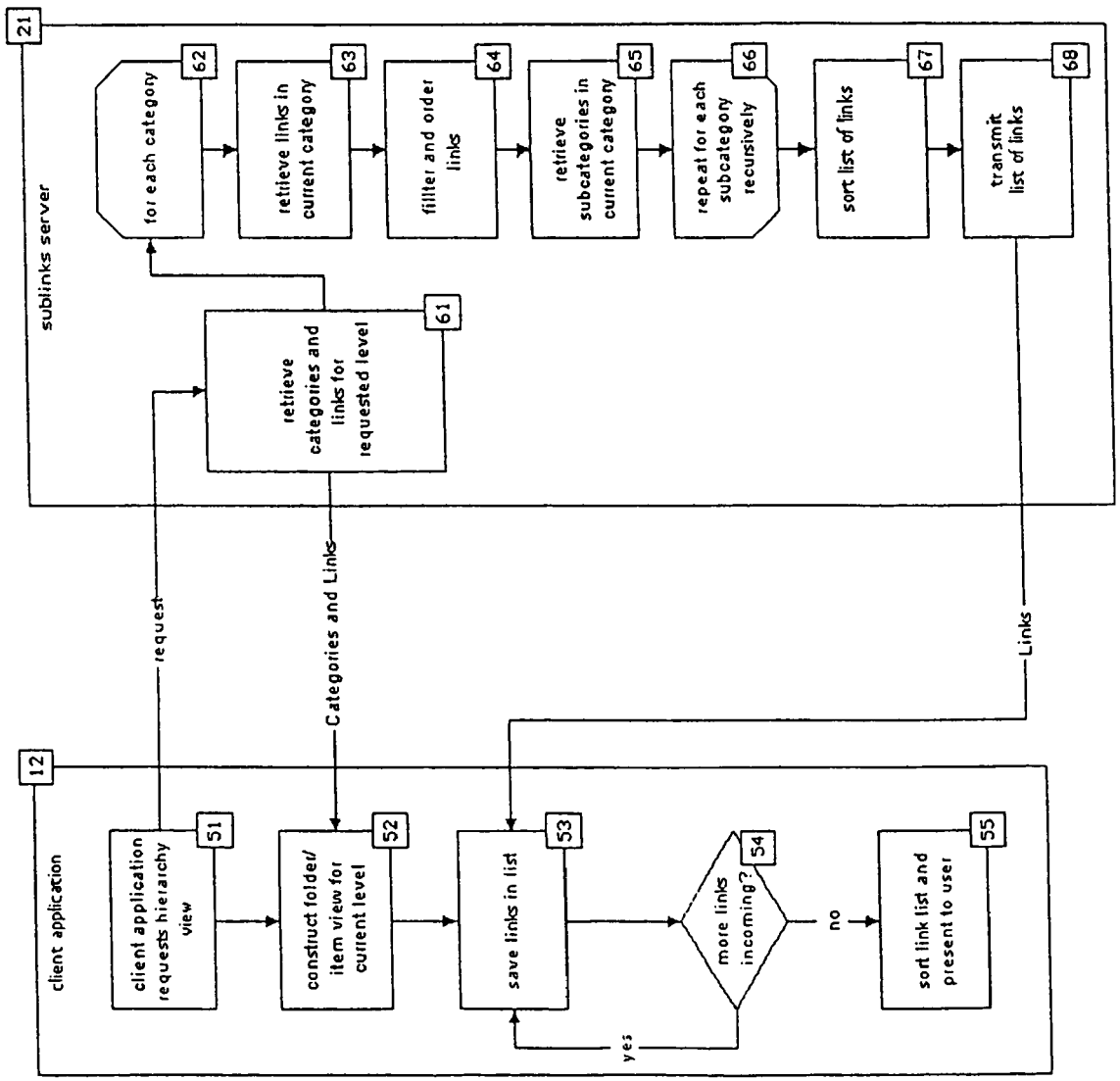
FIG. 5 shows a flowchart of communicating resource link information between the client and the server.

FIG. 5 shows a flowchart of communicating resource link information between the client and the server. The client application requests to view a certain category (51) by sending a request to the server application (21). The server application retrieves all resource links and categories placed within the category in question 61, these resource links are filtered, rated and ordered 64, and the process is repeated recursively for each category retrieved 66. After all requested resource. links have been retrieved, they are sorted by rating 67 and the sorted list is sent to the client application 68. The client application saves every new incoming link (53), waits until all links have arrived, or the server times out 54 and makes a final sorting before the list is presented to the user 55.

Figure 6:
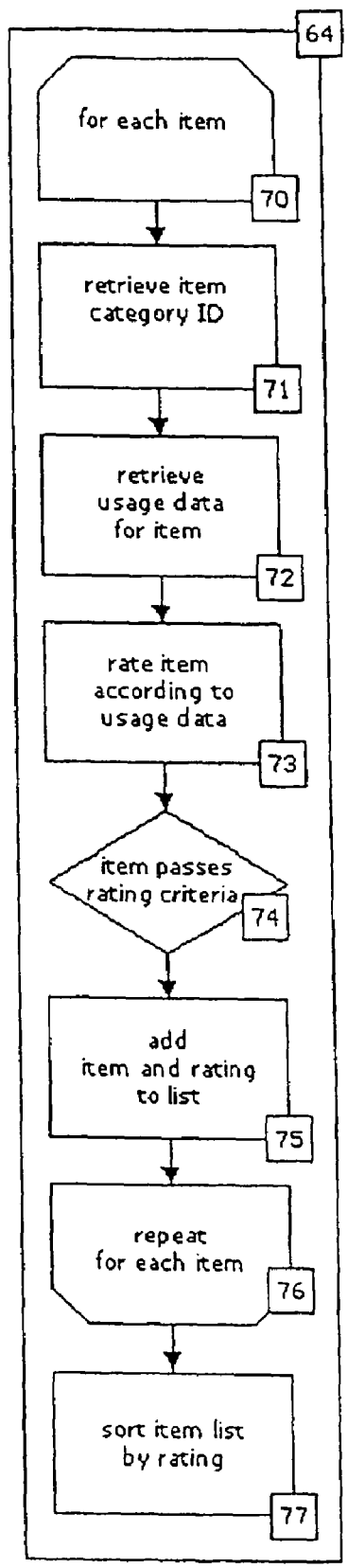
FIG. 6 shows a detailed flowchart of filtering and ordering resource links.

FIG. 6 shows a detailed flowchart of filtering and ordering resource links. The server application reviews every resource link 70, retrieves the category ID of the associated category 71, and a list of usage entries relating to the current item 72. The application then rates the item according to the current rating criteria 73. If the item passes the current filter criteria 74 it is added to the list along with the item rating 75 and processing moves onto the next resource link in the list 76. Finally, all links are sorted according. to their rating 77.

The current filter criteria may be defined by either the user or by the server, and may also comprise a separate rating and filtering process according to a set of rating criteria different those used previously 73. Thus, it may be possible to prevent resources that share certain characteristics from appearing in a listing.

Figure 7:
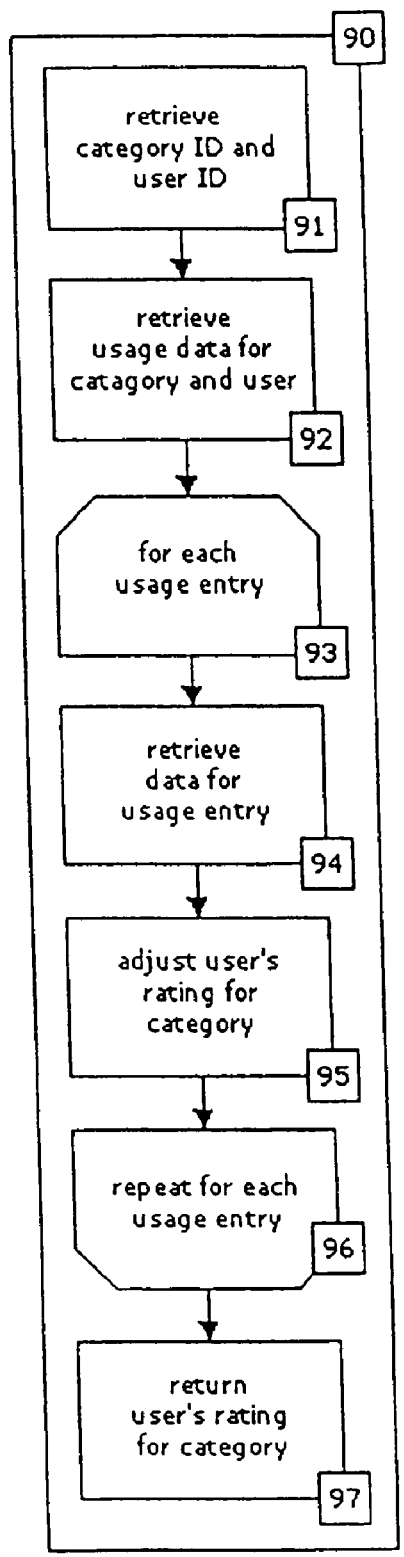
FIG. 7 shows a flowchart of rating a user's competence within a category.

FIG. 7 shows a flowchart of rating a user's competence within a category (c). Category ID and user ID are retrieved 91 and usage data relating to said users usage of resources in said category (c) is retrieved from the usage table 48. For each of these usage entries u(n) 93 activity parameters are retrieved 94 and the users rating in said category R(c) is adjusted accordingly 95. This is repeated until there are no usage entries for this category and user 96. Finally, the calculated user rating for this category is stored in the user table 44.

The calculation of a users rating in a category R(c), may be based-on various formulas;
R(c) is a linear function where each usage entry u(n) adds a fixed value to R(c)
R(c) is a linear function where each usage entry u(n) adds a fixed value to R(c), and divided by the total number of usage entries in said category (c).
R(c) is a logarithmic function, where each usage entry u(n) represents a slightly different change in R(c).

The rating R(c) may be a floating point number with a minimum value of 1.0 for users with no usage entries within said category, and a higher value for users with more usage entries within said category.

Figure 8:
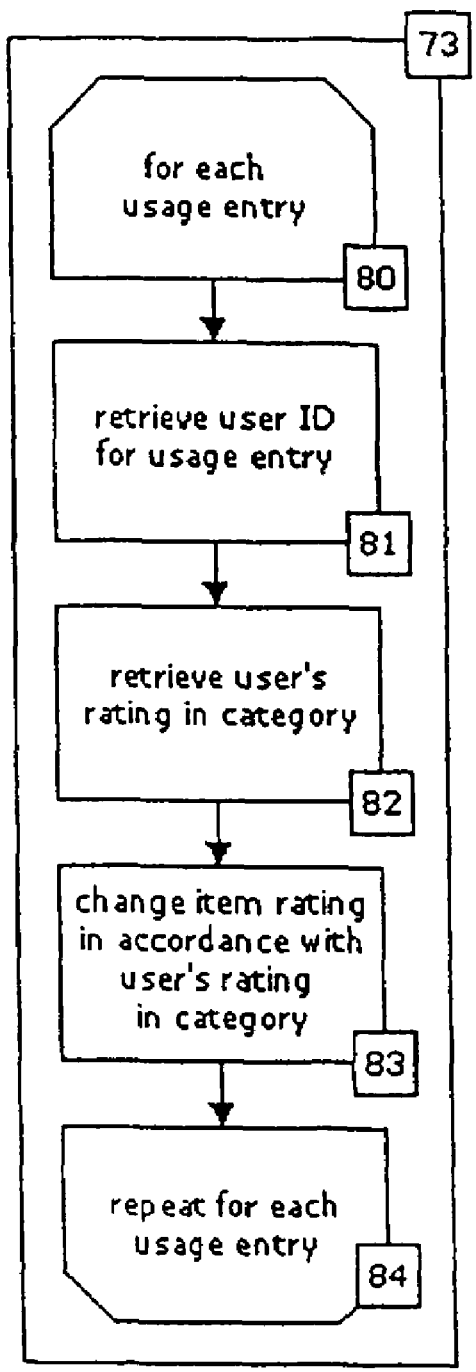
FIG. 8 shows a detailed flowchart- of rating resource links according to usage data.

FIG. 8 shows a detailed flowchart of rating resource links according to usage data. For every line in the usage table 48 relating to the current resource link 80, the application retrieves the user ID for the user that submitted the data, which comprise that usage entry, and a rating R(c) of that user's competence in the current category (c) 82. The current resource link's rating is then multiplied by R(c) 83 and the process is repeated until there are no more lines in the usage table 48 for that category 84.

This results in a rated list of resource links where the highest ranked are those that most high ranked user have accessed. Thus resources that are generally used more by people with higher competence within the current category are rated highest.

This rating could be performed in a number of other ways using the accumulated set of activity parameters in the database submitted by all the clients programs installed on machines, from which resources within said category has been accessed:

The rating could be based solely on the number of usage entries for each resource link. Thus, content accessed the most by all users of the system would be rated highest.

The rating could be based on usage by a subset of users, who share certain characteristics. These characteristics may include a rating of the user's competence within said category.

The rating could be based on the timestamp submitted as part of the activity parameters. Thus, content accessed more recently by a larger number of people may be rated highest.

The rating could be based on a modification date submitted as part of the activity parameters. Thus, content updated more recently may be rated highest.

The invention may be embodied as a computer program or a part of a computer program, which may be loaded into the memory of a computer and executed therefrom. The computer program may be distributed by means of any data storage or data transmission medium. The storage media can be magnetic tape, optical disc, compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), ferromagnetic memory, optical storage, charge coupled devices, smart cards, etc. The transmission medium can be a network, e.g. a local area network (LAN), a wide area network (WAN), or any combination thereof, e.g. the Internet. The network may comprise wire and wire-less communication links. Via the network a software embodiment (i.e. a program) of the invention, or a part thereof, may be distributed by transferring a program via the network.

The invention claimed is:

1. A method of obtaining a list of resource links indexed by categories in a interlinked category structure to be presented to a user via a user interface, the resource links pointing to resources on a network, the method comprising the following steps to be carried out by a computer system:
   monitoring users' interactions with resource links by:
      for users' interaction with a category in the interlinked category structure, generating a usage entry in a usage table on a server computer, wherein each usage entry includes a set of activity parameters including a link ID and a user ID;
      analyzing a user's interaction with the resource links placed in said category, including retrieving, from the usage table, the user's entries for resource links within said category; and
      calculating a user rating for the user in said category;
   rating resource links from categories in the category structure, the rating including:
      retrieving resource links placed within a given category; and
      rating the retrieved resource links using accumulated sets of activity parameters in the usage table, the resource links' ratings being based on calculated user ratings of a plurality of users who have previously interacted with a resource link within the given category.

2. A method according to claim 1, wherein the user rating within said category is calculated by assessing a frequency or duration of the user's interaction with resources pointed to by a resource link in said category.

3. A method according to claim 1, wherein the user rating within said category is calculated by assessing when the user has interacted with resources pointed to by a resource link in said category.

4. A method according to claim 1, wherein the resource links ratings are arranged in a rated list of resource links where higher rated resource links are accessed by higher rated users.

5. A method according to claim 1, wherein the resource links ratings are based on the number of usage entries for each resource link, such that content accessed the most often by all clients is rated higher.

6. A method according to claim 1, wherein the resource links ratings are based on usage by a subset of users who share certain characteristics, where these certain characteristics include the rating of the users within the requested category.

7. A method according to claim 1, wherein the resource links ratings are based at least in part on a timestamp submitted as part of the activity parameters.

8. A method according to claim 1, wherein the resource links ratings are based at least in part on a modification date submitted as part of the activity parameters.

9. A computer system, having means for executing a program, wherein the program when executed is to make the computer system execute the method according to claim 1.

10. A computer readable storage medium, having a program recorded thereon, wherein the program when executed is to make the computer system execute the method according to claim 1.

11. A method according to claim 1, wherein the user's rating in said category is calculated as a linear function of all the user's usage entries within said category divided by the total number of usage entries within said category.

12. A method according to claim 1, wherein the user's rating in said category is calculated as a logarithmic function where each usage entry within said category from the user represents a slightly different change in the user's rating in said category.

13. A method according to claim 1, wherein
   the user rating is a floating point number with a minimum value of 1.0 for users with no usage entries within said category, and a higher value for users with usage entries within said category, and
   each of the resource links ratings are a multiplication of the user ratings of all users that have accessed said resource link.

14. A method according to claim 1, wherein the calculation of a user rating within said one category comprises obtaining ratings of resource links in said category that the user has accessed, and the calculated user rating is based at least in part on the obtained resource link ratings.

* * * * *